United States Patent
Rackett (10) Patent No.: US 6,567,469 B1
(45) Date of Patent: May 20, 2003

(54) MOTION ESTIMATION ALGORITHM SUITABLE FOR H.261 VIDEOCONFERENCING APPLICATIONS

(75) Inventor: Albert E. Rackett, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/533,487

(22) Filed: Mar. 23, 2000

(51) Int. Cl.$^7$ ................................................ H04N 7/12
(52) U.S. Cl. ................................ 375/240.16; 348/699
(58) Field of Search ........................ 375/240.12, 240.15, 375/240.16, 240.17; 348/699, 416.1; 382/236, 238; 386/109, 111; 358/261.2, 430

(56) References Cited

U.S. PATENT DOCUMENTS 5,428,403 A * 6/1995 Andrew et al. .............. 348/699
5,568,203 A * 10/1996 Lee ............................ 348/699

(List continued on next page.)

FOREIGN PATENT DOCUMENTS

JP 410136373 A * 5/1998 ............ H04N/7/32
WO WO9843436 10/1998 ............ H04N/7/36

OTHER PUBLICATIONS

Pickering et al., "An adaptive block matching algorithm for efficient motion estimation", Internationa Conference on Image Processing, vol. 3, pp. 779–782, Sep. 1996.*

(List continued on next page.)

Primary Examiner—Vu Le
(74) Attorney, Agent, or Firm—John Vodopia (57) ABSTRACT

A method for identifying an optimum motion vector for a current block of pixels in a current picture in a process for performing motion estimation. The method is implemented by evaluating a plurality of motion vector candidates for the current block of pixels by, for each motion vector candidate, and calculating an error value that is representative of the differences between the values of the pixels of the current block of pixels and the values of a corresponding number of pixels in a reference block of pixels. While evaluating each motion vector candidate, the error value is checked, preferably at several points, while calculating the error value, and the evaluation is aborted for that motion vector candidate upon determining that the error value for that motion vector candidate exceeds a prescribed threshold value. The motion vector candidate that has the lowest calculated error value is selected as the optimum motion vector for the current block of pixels. The motion vector candidates are preferably evaluated in two distinct phases, including a first phase that includes evaluating a subset of the motion vector candidates that have an intrinsically high probability of being the optimum motion vector candidate, and a second phase that includes performing a spatial search within a prescribed search region of a reference picture in order to identify a different reference block of pixels within the prescribed search region for each respective motion vector candidate evaluation. The subset of motion vector candidates preferably includes a first motion vector candidate that corresponds to a location of the reference block of pixels in a reference picture that is the same as the location of the current block of pixels in the current picture, a second motion vector candidate that corresponds to a location of the reference block of pixels in a previous picture that is the same as the location of the current block of pixels in the current picture, and a third motion vector candidate that constitutes an optimum motion vector previously determined for a preceding block of pixels in the current picture. Preferably, no further evaluations are performed if it is determined that the error value for the first motion vector candidate is below a prescribed motion estimation termination threshold value. The method is executed by software that operates a software-implemented state machine. The software preferably includes source code that defines a search sequence, and a function that builds the state machine in a prescribed memory space.

19 Claims, 5 Drawing Sheets

U.S. PATENT DOCUMENTS

| | | | |
|---|---|---|---|
| 5,575,286 A | 11/1996 | Weng et al. | 128/653.1 |
| 5,594,504 A * | 1/1997 | Ebrahimi | 348/416 |
| 5,594,813 A * | 1/1997 | Fandrianto et al. | 382/236 |
| 5,604,546 A * | 2/1997 | Iwata | 348/699 |
| 5,696,836 A * | 12/1997 | Yoshino et al. | 382/107 |
| 5,721,595 A * | 2/1998 | Chen et al. | 348/699 |
| 5,751,838 A | 5/1998 | Cox et al. | 382/107 |
| 5,949,486 A * | 9/1999 | Ishihara et al. | 348/402 |
| 6,031,582 A * | 2/2000 | Nishikawa et al. | 348/699 |
| 6,154,492 A * | 11/2000 | Araki et al. | 375/240.16 |
| 6,236,679 B1 * | 5/2001 | Herluison et al. | 375/240 |
| 6,418,166 B1 * | 7/2002 | Wu et al. | 375/240.12 |

OTHER PUBLICATIONS

Ismaeil et al., "Motion estimation using long–term motion vector prediction", Proceeding Data Compression Conference, pp. 531+, Mar. 1999.*

* cited by examiner

FIG. 4D

MOTION ESTIMATION ALGORITHM SUITABLE FOR H.261 VIDEOCONFERENCING APPLICATIONS

BACKGROUND OF THE INVENTION

The present invention relates generally to digital video compression, and more particularly, to a hardware-efficient, high-performance motion estimation algorithm that has particular utility in H.261 digital video encoders.

Many different video compression algorithms have been developed for digitally encoding ("compressing") video data in order to minimize the bandwidth required to transmit the digitally-encoded video data ("digital video data") for a given picture quality. Several multimedia specification committees have established and proposed standards for encoding/compressing audio and video data. The most widely known and accepted international standards have been proposed by the Moving Pictures Expert Group (MPEG), including the MPEG-1 and MPEG-2 standards. Officially, the MPEG-1 standard is specified in the ISO/IEC 11172-2 standard specification document, which is herein incorporated by reference, and the MPEG-2 standard is specified in the ISO/IEC 13818-2 standard specification document, which is also herein incorporated by reference. These MPEG standards for moving picture compression are used in a variety of current video playback products, including digital versatile (or video) disk (DVD) players, multimedia PCs having DVD playback capability, and satellite broadcast digital video.

Although the MPEG standards typically provide high picture quality, the data rate/bandwidth requirements are far too great for some applications. Videoconferencing is a particular application that typically does not require the coding resolution afforded by MPEG because the picture content does not normally vary a great deal from picture-to-picture, e.g., most of the motion is confined to a diamond-shaped region in the picture where the head and shoulders of the conferee are located. In short, because there is so little motion in a sequence of moving pictures in a videoconferencing application, there is a great deal of redundancy from picture-to-picture, and consequently, the degree of video data compression which is possible for a given picture quality is much greater. Moreover, the available bandwidth for many videoconferencing systems is less than 2 Mbits/second, which is far too low for MPEG transmissions.

Accordingly, a collaboration of telecommunications operators and manufacturers of videoconferencing equipment developed the H.320 videoconferencing standards for videoconferencing over circuit-switched media like ISDN (Integrated Services Digital Network) and switched-56 connections. H.261 is the video coding component of this standard. It is also known as the Px64 standard since it describes video coding and decoding rates of px64 kbits/second, where p is an integer from 1 to 30. Thus, the H.261 video coding algorithm compresses video data at data rates ranging from 64 kbits/second to 1,920 kbits/second. The H.320 standard was ratified in Geneva in December of 1990. This standard is herein incorporated by reference.

Like MPEG, the H.261 encoding algorithm uses a combination of DCT (Discrete Cosine Transform) coding and differential coding. However, only I-pictures and P-pictures are used. An I-picture is coded using only the information contained in that picture, and hence, is referred to as an "Intra-coded" or "Intra" picture. A P-picture is coded using motion compensated prediction (or "motion estimation") based upon information from a past reference (or "anchor") picture, and hence, is referred to as a "Predictive" or "Predicted" picture. In accordance with the H.261 standard, the compressed digital video data stream is arranged hierarchically in four layers: picture, group of blocks (GOB), macroblock (MB), and block. A picture is the top layer. Each picture is divided into groups of blocks (GOBs0. A GOB is either one-twelfth of a CIF (Common Intermediate Format) picture. Each GOB is divided into 33 macroblocks. Each macroblock consists of a 16×16 pixel array.

In short, just like MPEG, H.261 uses motion estimation to code those parts of sequential pictures that vary due to motion, where possible. More particularly, H.261 uses "motion vectors" (MVs) that specify the location of a "macroblock" within the current picture relative to its original location within the anchor picture, based upon a comparison between the pixels of the current macroblock and corresponding array of pixels in the anchor picture within a given N×N-pixel search range. In accordance with the H.261 standard, the minimum search range is +/−7 pixels, and the maximum search range is +/−15 pixels. It will be appreciated that using the maximum search range in all H.261 applications will not necessarily improve the quality of the compressed signal. In this regard, since H.261 applications can operate at various bit rates, ranging from 64 kbits/second to 1,084 kbits/second, the actual search range employed may vary. For example, at high bit rates, the temporal distance between adjacent pictures is smaller, and thus, a smaller search range can be used to achieve a given picture quality. At low bit rates, the situation is reversed, and a larger search range is required in order to achieve a given picture quality.

Once the motion vector for a particular macroblock has been determined, the pixel values of the closest-matching macroblock in the anchor picture identified by the motion vector are subtracted from the corresponding pixels of the current macroblock, and the resulting differential values are then transformed using a Discrete Cosine Transform (DCT) algorithm, the resulting coefficients of which are each quantized and Huffman-encoded (as is the motion vector and other information pertaining to and identifying that macroblock). If during the motion estimation process no adequate macroblock match is detected in the anchor picture (i.e., the differential value exceeds a predetermined threshold metric), or if the current picture is an I-picture, the macroblock is designated an "Intra" macroblock and the macroblock is coded accordingly.

The H.261 standard does not specify any particular implementation of the motion estimation algorithm employed. Otherwise stated, the H.261 leaves open the details of implementation of the motion estimation algorithm to the manufacturers of the videoconferencing systems. In general, various measures or metrics have been utilized and proposed to compute the location of the pixel array within the anchor picture that constitutes the closest match (i.e., minimum difference/error) relative to the current macroblock, and various motion estimation algorithms have been utilized and proposed to search for and locate the closest-matching macroblock in the anchor picture. These motion estimation (M.E.) algorithms are typically performed by software running on a processor, e.g., a TriMedia processor manufactured and sold by Philips Semiconductors that is tasked with the encoding of the video data in the videoconferencing system. The overarching goal is to locate the closest-matching macroblock in the anchor picture as quickly as possible, while minimizing the load on the processor to execute the algorithm, and maintaining an acceptable level of error/inaccuracy. The hardware/software that actually executes the motion estimation search algorithm is sometimes termed the "search engine". In terms of the search engine, the overarching goal is to optimize its performance while minimizing the resources required to execute the motion estimation algorithm. Simply stated, the basic goal is to minimize compute effort and compute time.

Among the best-known criteria or metrics for evaluating the quality of a match are the Sum of the Absolute Differences (SAD) and the Sum of the Squared Differences (SSD). The SAD metric constitutes the sum of the absolute values of the differences of each of the N pixels in the current macroblock (N=256 for the case of a 16×16 macroblock) and the respective ones of the corresponding pixels of the comparison macroblock in the anchor picture under evaluation. The SSD metric constitutes the sum of the squares of the above pixel differences. During a given motion estimation search sequence, the candidate macroblock in the anchor picture that yields the smallest SAD or SSD value (whichever criterion/metric is used) is selected as the "best match". The horizontal and vertical position (i.e., x,y position) of this macroblock relative to the current macroblock (i.e., the x,y "offset"), or a derivative thereof, is specified as the "motion vector" for the current macroblock. If the SAD or SSD value (whichever is used) is larger than a predetermined threshold value, it is determined that a suitable match does not exist for the current macroblock, and it is coded as an Intra macroblock. In general, the SAD metric is easier and faster to compute, but less accurate, than the SSD metric. Otherwise stated, the SSD metric calculations require greater processor exertions than do SAD metric calculations, and thus, can be considered to be more "expensive", from a "cost function" standpoint.

In the H.261 domain, assuming a search range of +/−15 pixels, 961 candidate motion vectors must be evaluated, i.e., there are a total of 961 different macroblock-sized pixel arrays within the given search range of the anchor picture that are candidates for being the "best match" with the current macroblock being evaluated. Each motion vector evaluated will yield a different means square error (MSE) difference value. The motion vector having the minimum MSE value is the true "best match". Since each motion vector evaluation requires a large number of subtractions and additions, it is completely impractical for the motion estimation search engine to compute the MSE value for each of the 961 different motion vectors within the given search range. This theoretical "full search algorithm" always produces the true "best match". However, because it is impractical from an implementation standpoint, it is only used as a reference or benchmark to enable comparison of different more practical motion estimation algorithms that evaluate only a subset of the full set of motion vectors within a given search range, a technique sometimes referred to as "subsampling". Motion estimation algorithms that use this subsampling technique are sometimes referred to as "fast search algorithms", because they can be executed far faster and with far fewer computations than a "full search algorithm".

Generally speaking, there exists an inherent trade-off between the speed of the motion estimation search, on the one hand, and the accuracy (and thus, the resultant picture quality of the encoded digital video data) of the motion estimation search, on the other hand. Moreover, the performance of the search engine is directly related to its ability to minimize the data set that it produces. In this regard, a motion estimation algorithm that reduces the MSE between the current macroblock and the selected "best match" macroblock in the reference picture by a factor of n will approximately improve performance by the reciprocal of n. Thus, the overarching goal is to devise a motion estimation algorithm (search strategy) that optimizes performance while minimizing the required compute effort and compute time. In this regard, motion estimation can be considered mathematically equivalent to an optimization problem to find a minimum of a cost function.

In order to facilitate a better understanding of the principles underlying the present invention, a review of the theoretical framework of motion estimation searching follows. In overview, the array of MSE differences (961 MSE differences in the H.261 domain) may be visualized as an "error surface" with a height proportional to error. Since most televideoconferencing scenes contain predominantly low spatial frequency data, the error surface is also normally low in spatial frequency and smoothly undulating, with one or only a few "valleys" surrounding the minimum error. These characteristics of the error surface in the H.261 domain allow the use of severe subsampling in the search for a minimum error value for motion estimation. In particular, the error value associated with any single motion vector candidate evaluation provides information about an entire region of the search space, and the comparison of two error values associated with two motion vector candidate evaluations provides further information about the slope of the error surface between the two candidates. Pathological cases may arise, as in imaging a chess board. In such an image there will be a depression in the error surface in every case where the white squares match the white squares, and it would be challenging to locate the true minimum error value where the bishops and knights are also aligned. Thus, it can be appreciated that subsampling can lead to erroneous determinations, and that, all else being equal, the "success" (accuracy/resolution) of any search strategy is related to the number of samples evaluated (i.e., the density of sampling). Moreover, it can be appreciated that the success of a search strategy that relies upon subsampling is at least to some degree dependent upon the continuity of the error surface.

There are also vector correlations from one macroblock to spatially adjacent macroblocks and from a macroblock in one frame to the same macroblock in the following frame. For example, if a conferee's elbow moves three pixels northeast in frame n, it can reasonably be inferred that the conferee's hand in the adjacent macroblock will have the same sort of motion in frame n, and that both macroblocks will have a similar vector in frame n+1. These spatial and temporal correlations are imperfect, but too probable to be ignored. However, a search strategy that relies exclusively on these spatial and temporal correlations can only provide a fraction of the benefit available from motion compensation/motion coding.

Some previously proposed motion estimation algorithms have depended too heavily on the simplicity of the error surface, thereby greatly reducing the probability of correctly interpreting it. For example, one category of motion estimation algorithms that are particularly efficient are those that operate in a "dimension sequential" manner. Although the motion estimation algorithms within this category vary in detail, the following description of an exemplary motion estimation algorithm that operates in a "dimension sequential" manner should serve to illustrate the above-noted weakness with this category of motion estimation algorithms. More particularly, in accordance with this exemplary algorithm, a first series of evaluations are performed along the horizontal axis to locate the first minimum error point along the horizontal axis. A second series of evaluations are performed along a vertical line passing through the above-identified first minimum error point, and a second minimum error point along this vertical line is identified. Since the search is alternately performed in the horizontal and vertical dimensions of the search space, it can be thought of as a "dimension sequential" process. The spacing between candidates is then reduced, and the dimension sequential process is repeated, locating a row of candidates at each minimum error point identified. Finally, if time permits, the immediate neighborhood of the last "winner" (i.e., the candidate having the minimum error value) may be evaluated. Although the total number of evaluations required with this dimension sequential approach is minimal, the probability of missing the true minimum error in the entire error surface is quite high if the error surface contains more than one "valley".

Figure 1:
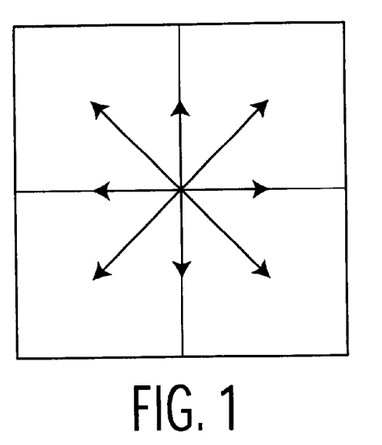
FIG. 1 is a diagram illustrating a search pattern used in a first previously-proposed motion estimation algorithm.

Most motion estimation algorithms operate two dimensionally and in several levels of increasing resolution (i.e., decreasing scope/range of search), and thus, can be thought of as being multi-level or hierarchical. An exemplary hierarchical algorithm doubles the resolution in each of four hierarchical levels. At each level, eight vectors, spaced 45° apart, are each evaluated, as is illustrated in FIG. 1. If the vector sizes are equally probable, that would represent an optimal solution. However, this strategy does not match the highly peaked distribution of vectors in a videoconferencing data set. In this regard, most of the benefit of motion estimation is derived from small vectors, but the above-mentioned exemplary hierarchical algorithm spends most of its time searching for large vectors. It is also entirely non-adaptive in its behavior, as it ignores the error surface data that suggest modifying the search sequence. The "northwest" candidate is evaluated first, and the "southwest" candidate is evaluated eighth at every level, irrespective of the shape of the error surface determined along the way, i.e., the search sequence is not adapted based upon determinations made during the search sequence.

Figure 2:
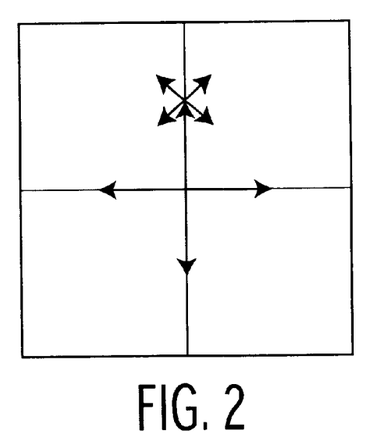
FIG. 2 is a diagram illustrating a search pattern used in a second previously proposed motion estimation algorithm.

If the desire is to reduce the processing burden, which invariably means reducing the number of evaluations, the most obvious strategy would be to sample more coarsely. In this connection, the 56 Kbs codec manufactured and sold by Compression Labs, Inc. (CLI) under the brand name "Rembrandt" in the late 1980's employed a motion estimation algorithm that evaluated four vectors, spaced 90° apart, at each level, rotating the pattern 45° in alternate levels, as is illustrated in FIG. 2. Offsets were N, E, W, and S in even levels, and NE, SE, SW, and NW in odd levels. While this motion estimation algorithm worked well for the applications for which it was designed, in videoconferencing applications, this search scheme not uncommonly misses the optimal vector due to the scarcity of the sampling.

Based upon the above and foregoing, there present exists a need in the art for a motion estimation algorithm that overcomes the drawbacks and shortcomings of the presently available technology. The present invention fulfills this need in the art with a simple and highly versatile implementation that reduces the required compute time and compute effort.

SUMMARY OF THE INVENTION

The present invention encompasses a method for identifying an optimum motion vector for a current block of pixels in a current picture in a process for performing motion estimation. The method is implemented by evaluating a plurality of motion vector candidates for the current block of pixels by, for each motion vector candidate, and calculating an error value that is representative of the differences between the values of the pixels of the current block of pixels and the values of a corresponding number of pixels in a reference block of pixels. While evaluating each motion vector candidate, the error value is checked, preferably at several points, while calculating the error value, and the evaluation is aborted for that motion vector candidate upon determining that the error value for that motion vector candidate exceeds a prescribed threshold value. The motion vector candidate that has the lowest calculated error value is selected as the optimum motion vector for the current block of pixels.

The motion vector candidates are preferably evaluated in two distinct phases, including a first phase that includes evaluating a subset of the motion vector candidates that have an intrinsically high probability of being the optimum motion vector candidate, and a second phase that includes performing a spatial search within a prescribed search region of a reference picture in order to identify a different reference block of pixels within the prescribed search region for each respective motion vector candidate evaluation.

The subset of motion vector candidates preferably includes a first motion vector candidate that corresponds to a location of the reference block of pixels in a reference picture that is the same as the location of the current block of pixels in the current picture, a second motion vector candidate that corresponds to a location of the reference block of pixels in a previous picture that is the same as the location of the current block of pixels in the current picture, and a third motion vector candidate that constitutes an optimum motion vector previously determined for a preceding block of pixels in the current picture. Preferably, no further evaluations are performed if it is determined that the error value for the first motion vector candidate is below a prescribed motion estimation termination threshold value.

The spatial search is preferably performed in a plurality of different search levels. In a presently preferred embodiment, the spatial search at each search level is reentrant, and is preferably performed, at each search level, by re-centering the spatial search on the best motion vector candidate identified to that point in the spatial search, the best motion vector candidate being the one that has an error value lower than the lowest error value found to that point in the spatial search. Preferably, the search pattern of the spatial search is adaptively varied in a heuristic manner based upon the results of the evaluations made during the spatial search.

The method is executed by software that operates a software-implemented state machine. The software preferably includes source code that defines a search sequence, and a function that builds the state machine in a prescribed memory space. The source code is preferably only executed once, at initialization. The search sequence is preferably an adaptive heuristic search sequence. The source code, at any point in the search sequence, identifies the appropriate x,y positions for the next motion vector candidate to be evaluated by making a single read from the prescribed memory space. Further, the source code, at any point in the search sequence, identifies the next motion vector candidate to be evaluated by reading one of two locations in the memory space, depending upon the polarity of a test bit that indicates either that a new best motion vector candidate has been identified or the results of a comparison between the two most recent evaluations.

BRIEF DESCRIPTION OF THE DRAWINGS

These and other objects, features, and advantages of the present invention will become r readily apparent from the following detailed description read in conjunction with the accompanying drawings, in which.

DETAILED DESCRIPTION OF THE INVENTION

A motion estimation algorithm according to an exemplary embodiment of the present invention is described below. This motion estimation algorithm is implemented in software that can be executed on a processor, such as the TriMedia processor made and sold by Philips Semiconductors. The source code that embodies an exemplary implementation of the motion estimation algorithm of the present invention is attached hereto as Appendix I. This source code and the accompanying commentary constitute an integral part of this disclosure, for all purposes. A person of ordinary skill in the pertinent art, upon reading the present disclosure, will recognize that various novel aspects and features of the present invention can be practiced independently or in any suitable combination, and further, that the disclosed embodiment is merely illustrative.

The motion estimation algorithm of the present invention achieves high performance while minimizing compute time and compute effort in a number of different ways, each of which are described below.

In accordance with a first novel aspect of the present invention, all evaluations are checked while in progress, preferably at several points, and the evaluation immediately aborted if the current value is greater than the previously identified best value, thereby saving a considerable amount of compute effort and compute time. It will be recognized that it is important to identify the smallest possible error values as soon as possible in order to thereby maximize the computational savings that can be realized by using this evaluation abort scheme.

In accordance with a second novel aspect of the present invention, the search for an optimum motion vector is divided up into a coarse search phase and a fine search phase. In the coarse search phase, the most highly likely motion vector candidates (i.e., those candidates that have the highest inherent probability of having the lowest error value) are evaluated. If any of these most highly likely motion vector candidates are approximately correct, they will yield a small error value. In the fine search phase, a spatial search is performed in a plurality (e.g., 3) of different search levels. The coarse search phase can also be thought of as a "pre-spatial search phase."

In the particular exemplary embodiment executed by the software listed in Appendix I, the three most highly likely vector candidates are as follows. The first most likely motion vector candidate that is evaluated is (0,0), i.e., that of the same macroblock in the reference frame. In the exemplary embodiment, the search evaluation metric that is used is SAD. If the SAD value is below a specified threshold (in the exemplary embodiment it is set to "384"), no appreciable gain can be expected from the motion estimation procedure, and the function is thus immediately exited. To take full advantage of this determination, the calling function should interpret the returned low error value as a VCAP "do not code" command, and skip the forward DCT as well as the motion estimation. This measure alone can result in significant savings in compute time and compute effort. In this connection, it has been estimated that approximately 60% of the overall computational load in H.261 coding applications is attributable to the motion estimation process. A significant fraction of macroblocks (e.g., 33% of the macroblocks) in almost all videoconferencing applications may be simply "replenished", thereby requiring almost no processing time and no coefficient data. The above-described measure can thus potentially reduce the computational load of motion estimation by a significant amount.

The second most highly likely vector candidate that is evaluated is that of the same macroblock in the previous frame. This selection is based upon the fact that motion is often consistent in velocity and direction over several frames in a particular region, and the motion experienced in one frame is highly correlated with that in the following frame.

The third most highly likely vector candidate that is evaluated (except for macroblocks at the left edge of the frame) is the motion vector determined for the preceding macroblock in the same frame. Again, this selection is based on the fact that if the region in motion is larger than one macroblock, an entire group of macroblocks will have similar motion vectors.

Figure 3:
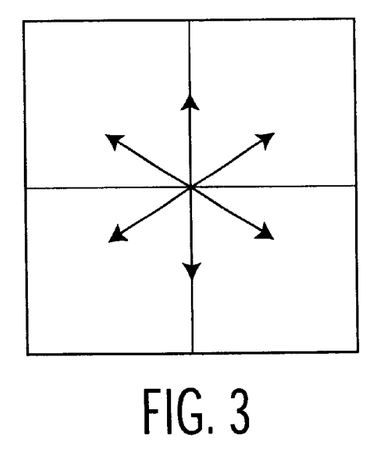
FIG. 3 is a diagram illustrating a search pattern used in a presently preferred embodiment of the motion estimation algorithm of the present invention.

In accordance with a third novel aspect of the present invention, six candidates, spaced 60° apart from one another, are evaluated in each of the first two search levels of the fine search phase, as is illustrated in FIG. 3. Two "hexagonal" search patterns are evaluated sequentially in the first two search levels. The first search pattern has (x,y) coordinates (4,0) and (2,3), with four conjugate pairs, and the second search pattern has (x,y) coordinates (2,0) and (1,2), with four conjugate pairs. All eight peripheral candidates are evaluated in the third search level. For comparison, the classic hierarchical search performs 1+8+8+8+8=33 SAD evaluations, whereas the exemplary search employed by the motion estimation algorithm present invention performs a minimum of, including the coarse search phase (i.e., prior to the spatial search), 3+6+6+8=23 SAD evaluations. However, it will be recognized that most of these evaluations will be reduced in duration by virtue of the evaluation abort scheme described above.

In accordance with a fourth novel aspect of the present invention, the search performed at each search level is centered on the best candidate identified, rather than on the center of the search region. In this manner, the error surface is followed "downhill" as it is analyzed, following the slope in any direction that it leads. More particularly, the search performed at each search level is "reentrant", in that in each search level, whenever a motion vector candidate having a new minimum error value (i.e., lower than the previously identified best error value) is identified, its location becomes the center of another set of evaluations, i.e., six candidates, spaced 60° apart from one another. The evaluations continue in this manner until it is determined that the latest "best" motion vector candidate is surrounded by six "inferior" motion vector candidates (eight in the third level of the fine search phase, as will become apparent hereinafter). It will be recognized that small vectors (e.g., in the vicinity of zero error value), which constitute the majority in a videoconferencing application, will require only a small number of additional evaluations in order to complete a reentry. Large vectors will require more evaluations, but they are infrequent.

In this manner, either the motion vector candidate having the true "global" minimum error value will be found, or the motion vector candidate having what is known as the "local" minimum error value will be found. In either case, some motion compensation gain will result, but this gain will be reduced, of course, if the motion vector candidate having the true "global" minimum error value is not found. By this means, the relatively small first search pattern can quickly follow the error surface slope out to a remote minimum. It is in this region that the motion estimation algorithm should spend its time locating the smallest minimum, rather than methodically cataloguing the entire search space.

While this "shortcut" may be prone to some error, the overall performance in the context of a videoconferencing application is enhanced by virtue of the statistical behavior of the video data in this application. For example, a case where the error surface is lower in both east and west directions, the minima in the west direction will more likely be identified, simply because that direction is evaluated first, making it more difficult to follow the error surface in the east direction. Nevertheless, even the false minima that may be found in this and similar cases will tend to have a small value, thus mitigating the adverse consequences of the error.

In accordance with a fifth novel aspect of the present invention, for each set of evaluations, the search range or scope is reduced, e.g., only the motion vector candidates within a specified pixel offset (search range), e.g., +/−four pixels, from the location of the most recently identified "best" motion vector candidate, are evaluated. This technique is based upon the observation that since the overwhelming majority of optimal motion vectors will have small vector values, it is extremely wasteful of processor resources to evaluate six very remote candidates at the start of every search sequence. Although a broader search range is very effective in quickly identifying motion vectors with large vector values, its speed in these infrequent cases comes at too high a price. The reduced search range technique still results in identification of the optimum motion vectors, in the majority of the cases. In the minority of cases when the true minimum is more remote, it is assumed that the first level candidate in the general direction of the minimum will have a smaller value than the zero candidate, and the search may be extended from that point. Of course, any arbitrary error surface topography is possible, and in some cases, the assumption will prove to be false, causing the algorithm to fail to locate a remote minimum. In this connection, it should be appreciated that the motion estimation algorithm of the present invention does not guarantee success, but rather, it attempts to maximize the probability of success. Every aspect of the algorithm is based on statistical probabilities, not certainty, and much of the performance is achieved by increasing the probability of locating the far more numerous small vector minima, while only slightly reducing the probability of locating the far more infrequent large vector minima.

In accordance with a sixth novel aspect of the present invention, the search pattern is adaptively varied in a heuristic manner based upon the search history. The classic hierarchical search pattern is left to right, and top to bottom, without any variation. The reentrant aspect of the algorithm of the present invention makes it profitable to vary the search sequence according to the search history. To take a simple case, if the "west" candidate were evaluated first, and then the "east" candidate was found to be smallest, the search pattern would be re-centered on the optimal vector found (i.e., the "east" candidate) and re-started. The search pattern can then be adaptively varied to take this finding into account. In this regard, the algorithm is programmed to have the intelligence to begin the next set of evaluations with the "east" candidate, and to not re-evaluate the new "west" candidate since it was the old "center" candidate before the re-centering of the search, and thus, was already evaluated in the prior evaluation sequence. In general, the algorithm of the present invention is programmed to utilize the knowledge that is gained from prior evaluations to avoid repeated processing, and to adaptively vary the search to maximize search efficiency. Since each of the three search levels (of the fine search phase) may be re-entered multiple times, with the search center moved in several of six or eight directions, the vector array may be evaluated with literally hundreds of search patterns, each optimized (as much as possible with the few parameters given) to the particular error surface encountered.

In accordance with a seventh novel aspect of the present invention, the motion estimation algorithm is executed by a software-implemented state machine. The search intelligence resides in a 512-word memory space that is pointed to by a function stseq. A memory space containing its own addresses is simply a definition of a state machine. The source code which defines the search pattern need only be executed once, at initialization.

At any point in a search sequence, the appropriate x,y positions for the next vector candidate to be evaluated are made available with a single read from the 512-word memory space. At any point in the search sequence, one of two vectors are read, depending on the polarity ('1' or '0') of a single "test" bit which forms the Most Significant Bit (MSB) of the memory (buffer) address. Normally, the "test" bit indicates that a new "best" candidate vector has been found; in other cases, it indicates the result of a comparison between the two most recent evaluations. In this manner, at each test point, a binary choice is made between two potential vector candidates to be evaluated next. The remaining 8 address bits are supplied by the buffer itself. The choice between acting on a given set of offsets or interpreting the current state as a request for a comparison is made by giving an offset a disallowed value. The address is then incremented.

It should be appreciated that any motion estimation search strategy whatever over a wide range of complexity may be embedded in the state machine buffer with no cost in processor overhead, e.g., TriMedia cycles. Execution time will remain roughly the number of vector candidates evaluated times the period required for an evaluation (i.e., an SAD calculation), with some reduction if a good candidate is located quickly. It should also be appreciated that the particular search scheme described hereinabove is only one of an unlimited number of schemes that could just as easily be incorporated, perhaps with far superior results.

Figure 4A:
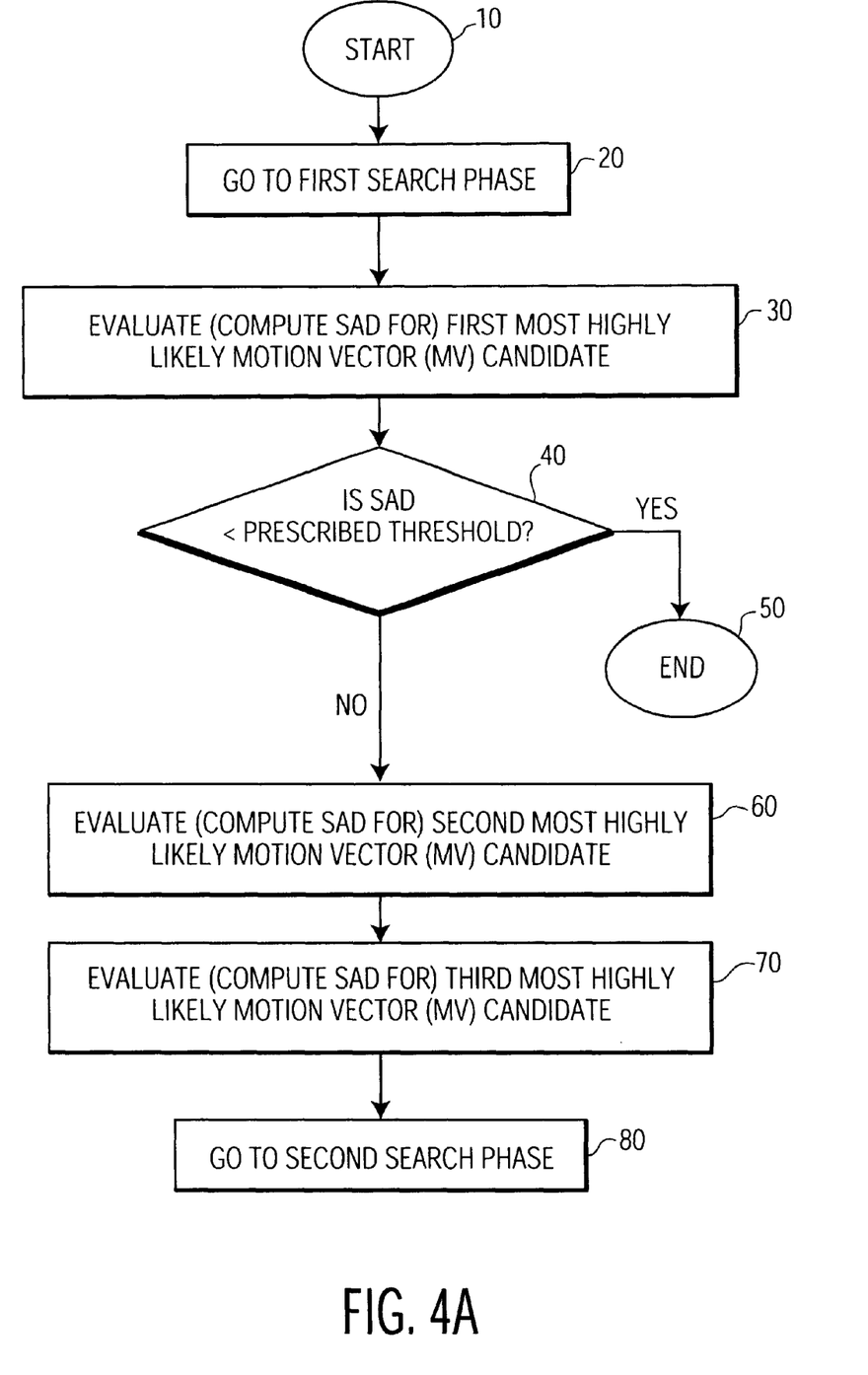
FIGS. 4A–4D depict successive portions of a flow chart diagram that illustrates the above-described motion estimation algorithm that constitutes the currently contemplated preferred embodiment of the present invention.

With reference now to FIGS. 4A–4D, there can be seen successive portions of a flow chart diagram that illustrates the above-described motion estimation algorithm that constitutes the currently contemplated preferred embodiment of the present invention. With reference to FIG. 4A, the algorithm starts at step 10 and immediately goes into the first search phase at step 20. In the first search phase, the SAD for the first most highly likely motion vector (MV) candidate is computed at step 30. At step 40, a decision is made as to whether or not the SAD is less than a prescribed threshold. If the decision is "yes", then the entire algorithm is ended (exited) at step 50. If the decision is "no", then the algorithm proceeds to step 60, where the SAD for the second most highly likely motion vector (MV) candidate is computed. The algorithm then proceeds to step 70, where the SAD for the third most highly likely motion vector (MV) candidate is computed. Next, at step 80, the algorithm proceeds to the second search phase.

Figure 4B:
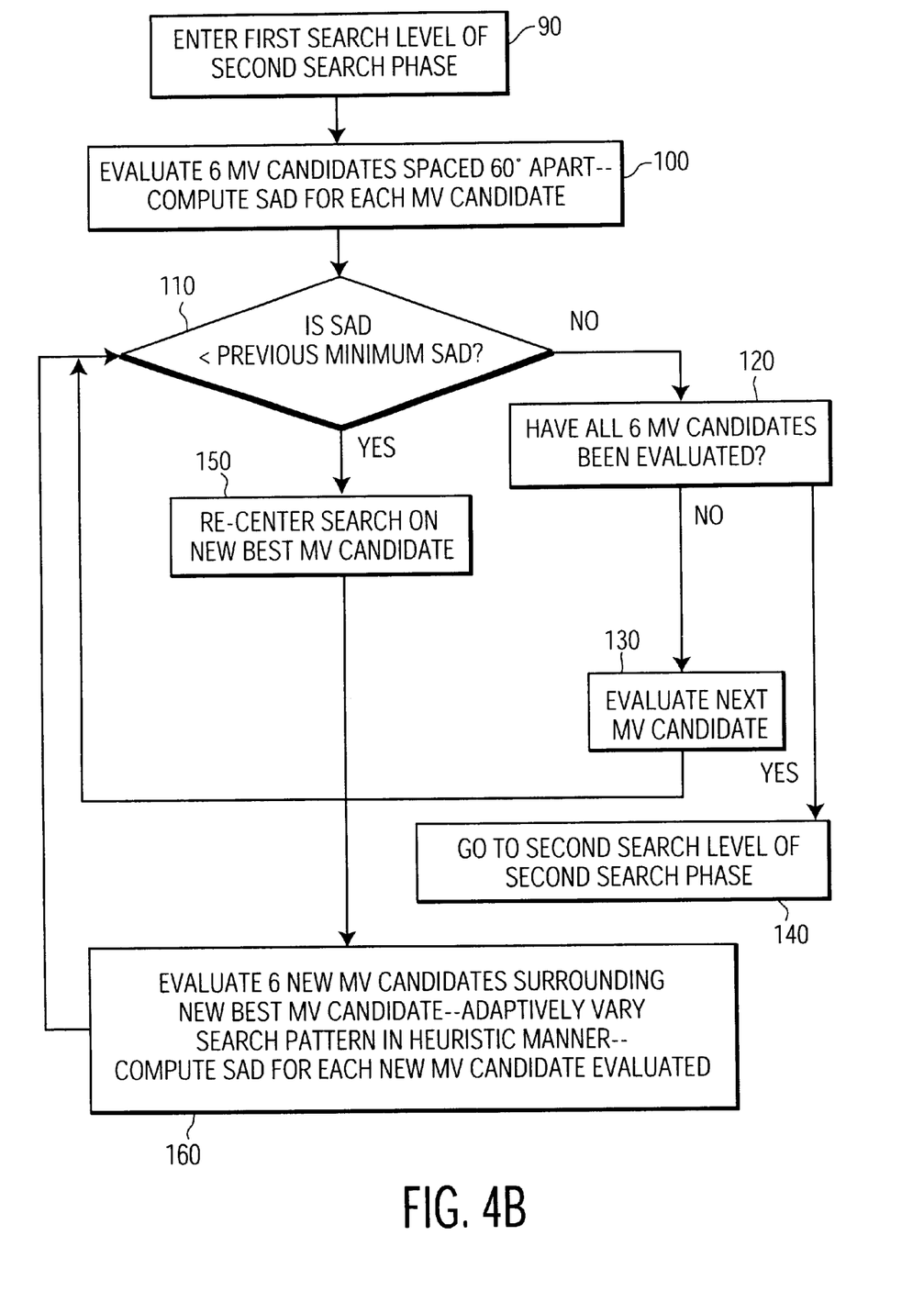

With reference now to FIG. 4B, the algorithm enters into the first search level of the second search phase, at step 90. Next, at step 100, 6 MV candidates spaced 60° apart from one another are evaluated, by computing the SAD for each such MV candidate. At step 110, a decision is made as to whether or not the SAD is less than a previous minimum SAD. If the decision at step 110 is "yes", then the search is re-entered at step 150 by re-centering the search on the new best MV candidate, i.e., the one having the new minimum SAD. The algorithm then proceeds to step 160, where the 6 new MV candidates surrounding the new best MV candidate are evaluated, with the search pattern preferably being adaptively varied in a heuristic manner. The algorithm then loops back to step 110. If the decision at step 110 is "no", then a decision is made at step 120 as to whether or not all 6 MV candidates have been evaluated. If the decision at step 120 is "no", then the algorithm proceeds to step 130, where the next MV candidate is evaluated, with the algorithm looping back to step 110. If the decision at step 120 is "yes", then the algorithm proceeds to the next (second) search level of the second search phase, at step 140.

Figure 4C:
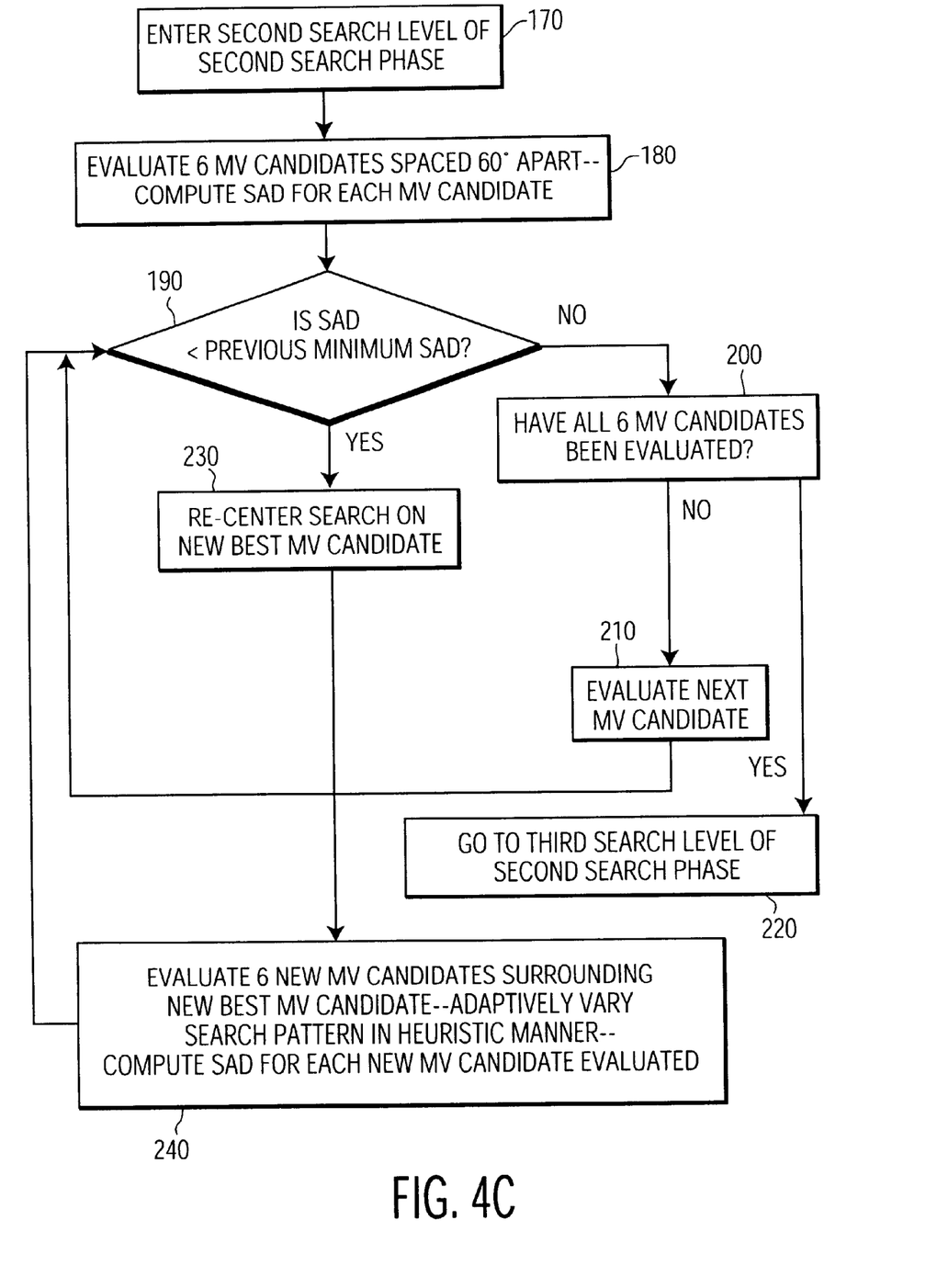

With reference now to FIG. 4C, the algorithm enters into the second search level of the second search phase, at step 170. Next, at step 180, 6 MV candidates spaced 60° apart from one another are evaluated, by computing the SAD for each such MV candidate. At step 190, a decision is made as to whether or not the SAD is less than a previous minimum SAD. If the decision at step 190 is "yes", then the search is re-entered at step 230 by re-centering the search on the new best MV candidate, i.e., the one having the new minimum SAD. The algorithm then proceeds to step 240, where the 6 new MV candidates surrounding the new best MV candidate are evaluated, with the search pattern preferably being adaptively varied in a heuristic manner. The algorithm then loops back to step 190. If the decision at step 190 is "no", then a decision is made at step 200 as to whether or not all 6 MV candidates have been evaluated. If the decision at step 200 is "no", then the algorithm proceeds to step 210, where the next MV candidate is evaluated, with the algorithm looping back to step 190. If the decision at step 200 is "yes", then the algorithm proceeds to the next (third) search level of the second search phase, at step 220.

Figure 4D:
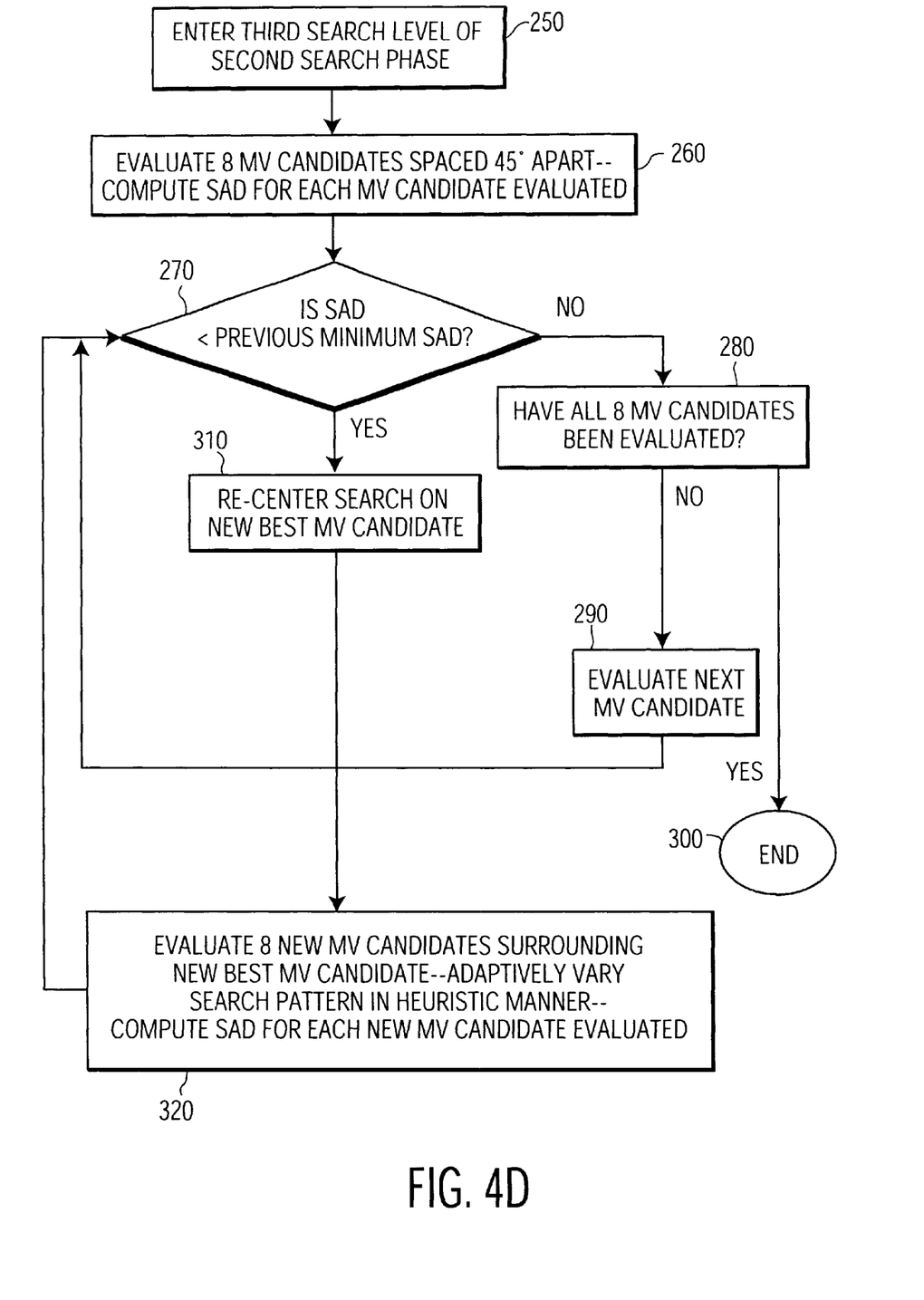

With reference now to FIG. 4D, the algorithm enters into the third search level of the second search phase, at step 250. Next, at step 260, 8 MV candidates spaced 45° apart from one another are evaluated, by computing the SAD for each such MV candidate. At step 270, a decision is made as to whether or not the SAD is less than a previous minimum SAD. If the decision at step 270 is "yes", then the search is re-entered at step 310 by re-centering the search on the new best MV candidate, i.e., the one having the new minimum SAD. The algorithm then proceeds to step 320, where the 8 new MV candidates surrounding the new best MV candidate are evaluated, with the search pattern preferably being adaptively varied in a heuristic manner. The algorithm then loops back to step 270. If the decision at step 270 is "no", then a decision is made at step 280 as to whether or not all 8 MV candidates have been evaluated. If the decision at step 280 is "no", then the algorithm proceeds to step 290, where the next MV candidate is evaluated, with the algorithm looping back to step 270. If the decision at step 280 is "yes", then the algorithm is ended (exited), at step 300.

Although not implemented in the exemplary embodiment described hereinabove, it is also possible to use a coarser search evaluation metric, e.g., SAD, during a first search phase that encompasses a broad search region, and a finer search evaluation metric, e.g., SSD, during a second search phase that encompasses a narrower search region. In this way, the speedy SAD evaluation metric can be used when the search region is broad, and the more computationally intensive SSD evaluation metric can be used after the search region has been narrowed down.

Although the present invention has been described in detail hereinabove, it should be appreciated that many variations and/or modifications and/or alternative embodiments of the basic inventive concepts taught herein that may appear to those skilled in the pertinent art will still fall within the spirit and scope of the present invention as defined in the appended claims.

What is claimed is:

1. A method for identifying an optimum motion vector for a current block of pixels in a current picture in a process for performing motion estimation, comprising:

a first search phase for evaluating a subset of motion vector candidates for the current block of pixels, the subset including at least one motion vector candidate having an intrinsically high probability of being the optimum motion vector candidate, wherein evaluating the at least one motion vector candidate of the subset includes (i) calculating an error value for the at least one motion vector candidate that is representative of the differences between the values of the pixels of the current block of pixels and the values of a corresponding number of pixels in a reference block of pixels and (ii) responsive to the error value being less than a prescribed threshold error value, identifying the corresponding motion vector candidate as the optimum motion vector and aborting further evaluations of motion vector candidates; and a second search phase having at least two search levels and implemented only if further evaluations were not aborted in the first search phase, each search level including:

evaluating each of a plurality of motion vector candidates at the search level for the current block of pixels by, for each motion vector candidate at the search level, calculating an error value that is representative of the differences between the values of the pixels of the current block of pixels and the values of a corresponding number of pixels in a reference block of pixels;

while evaluating each motion vector candidate at the search level, checking the corresponding calculated error value, and aborting the evaluation for the corresponding motion vector candidate upon determining that the error value for that motion vector candidate exceeds a previous minimum error value for the plurality of motion vector candidates at the respective search level; and selecting as the optimum motion vector candidate for a respective search level, the motion vector candidate having the lowest calculated error value of the motion vector candidates of the respective search level, wherein identifying the optimum motion vector includes the lowest calculated error value of the motion vector candidates of the last search level of the at least two search levels of the second search phase.

2. The method as set forth in claim 1, further comprising; implementing the method in software executed by a processor that implements a motion estimation algorithm.

3. The method as set forth in claim 1, further comprising: implementing the method in a video coding apparatus configured for an H.261 videoconferencing application.

4. The method as set forth in claim 1, wherein a search level of the second search phase further includes performing a spatial search within a prescribed search region of a reference picture in order to identify a different reference block of pixels within the prescribed search region for each respective motion vector candidate evaluation at the search level.

5. The method as set forth in claim 4, wherein the spatial search is an adaptive heuristic search.

6. The method as set forth in claim 4, wherein the spatial search further includes re-centering the spatial search on a best motion vector candidate identified up to a current point in the spatial search, the best motion vector candidate being the one that has an error value lower than the lowest error value found up to that point in the spatial search.

7. The method as set forth in claim 4, wherein the spatial search is reentrant.

8. The method as set forth in claim 4, wherein a search pattern of the spatial search is adaptively varied as a function of evaluation results obtained during the spatial search.

9. The method as set forth in claim 1, wherein the subset of motion vector candidates includes:
   a first motion vector candidate that corresponds to a location of the reference block of pixels in a reference picture that is the same as the location of the current block of pixels in the current picture;
   a second motion vector candidate that corresponds to a location of the reference block of pixels in a previous picture that is the same as the location of the current block of pixels in the current picture; and
   a third motion vector candidate that constitutes an optimum motion vector previously determined for a preceding block of pixels in the current picture.

10. A method for identifying an optimum motion vector for a current block of pixels in a current picture in a process for performing motion estimation, comprising:
    identifying a plurality of motion vector candidates for the current block of pixels;
    evaluating the plurality of motion vector candidates for the current block of pixels by, for each motion vector candidate, calculating an error value that is representative of the differences between the values of the pixels of the current block of pixels and the values of a corresponding number of pixels in a reference block of pixels; and
    selecting as the optimum motion vector the motion vector candidate that has the lowest calculated error value;
    wherein the evaluating includes a first search phase for evaluating at least one motion vector candidate of a subset of the motion vector candidates that have an intrinsically high probability of being the optimum motion vector candidate, wherein evaluating the at least one motion vector candidate of the subset includes (i) calculating an error value for the at least one motion vector candidate that is representative of the differences between the values of the pixels of the current block of pixels and the values of a corresponding number of pixels in a reference block of pixels and (ii) responsive to the error value being less than a prescribed threshold error value, identifying the corresponding motion vector candidate as the optimum motion vector and aborting further evaluations of motion vector candidates, and a second search phase having at least two search levels and implemented only if further evaluations were not aborted in the first search phase, each search level including performing a spatial search within a prescribed search region of a reference picture in order to identify a different reference block of pixels within the prescribed search region for each respective motion vector candidate evaluation of the second search phase, and selecting as the optimum motion vector candidate for a respective search level, the motion vector candidate having the lowest calculated error value of the motion vector candidates of the respective search level, wherein identifying the optimum motion vector includes the lowest calculated error value of the motion vector candidates of the last search level of the at least two search levels of the second search phase.

11. The method as set forth in claim 10, wherein the spatial search is an adaptive heuristic search.

12. The method as set forth in claim 10, wherein the subset of motion vector candidates includes:
    a first motion vector candidate that corresponds to a location of the reference block of pixels in a reference picture that is the same as the location of the current block of pixels in the current picture;
    a second motion vector candidate that corresponds to a location of the reference block of pixels in a previous picture that is the same as the location of the current block of pixels in the current picture; and
    a third motion vector candidate that constitutes an optimum motion vector previously determined for a preceding block of pixels in the current picture.

13. The method as set forth in claim 10, wherein the spatial search further includes re-centering the spatial search on a best motion vector candidate identified up to a current point in the spatial search, the best motion vector candidate being the one that has an error value lower than the lowest error value found up to that point in the spatial search.

14. The method as set forth in claim 10, wherein a search pattern of the spatial search is adaptively varied as a function of evaluation results obtained during the spatial search.

15. The method as set forth in claim 10, wherein the method is executed by software that includes:
    source code that defines a search sequence; and
    a function that builds a corresponding state machine in a prescribed memory space.

16. The method as set forth in claim 15, wherein the search sequence is an adaptive heuristic search sequence.

17. The method as set forth in claim 15, wherein the source code, at any point in the search sequence, identifies the appropriate x,y positions for the next motion vector candidate to be evaluated by executing a single read from the prescribed memory space.

18. The method as set forth in claim 17, wherein the source code, at any point in the search sequence, identifies the next motion vector candidate to be evaluated by reading one of two locations in the memory space, depending upon a polarity of a test bit that indicates either that a new best motion vector candidate has been identified or the results of a comparison between the two most recent evaluations.

19. A method for identifying an optimum motion vector for a current block of pixels in a current picture in a process for performing motion estimation, comprising:
    identifying a plurality of motion vector candidates for the current block of pixels;
    evaluating the plurality of motion vector candidates for the current block of pixels by, for each motion vector candidate, calculating an error value that is representative of the differences between the values of the pixels of the current block of pixels and the values of a corresponding number of pixels in a reference block of pixels; and selecting as the optimum motion vector the motion vector candidate that has the lowest calculated error value;

wherein the evaluating includes a first search phase for evaluating at least one motion vector candidate of a subset of the motion vector candidates that have an intrinsically high probability of being the optimum motion vector candidate, wherein evaluating the at least one motion vector candidate of the subset includes (i) calculating an error value for the at least one motion vector candidate that is representative of the differences between the values of the pixels of the current block of pixels and the values of a corresponding number of pixels in a reference block of pixels and (ii) responsive to the error value being less than a prescribed threshold error value, identifying the corresponding motion vector candidate as the optimum motion vector and aborting further evaluations of motion vector candidates, and a second search phase having at least two search levels and implemented only if further evaluations were not aborted in the first search phase, each search level including performing a spatial search within a prescribed search region of a reference picture in order to identify a different reference block of pixels within the prescribed search region for each respective motion vector candidate evaluation of the second search phase, and selecting as the optimum motion vector candidate for a respective search level, the motion vector candidate having the lowest calculated error value of the motion vector candidates of the respective search level, wherein identifying the optimum motion vector includes the lowest calculated error value of the motion vector candidates of the last search level of the at least two search levels of the second search phase; and wherein the spatial search is an adaptive heuristic search.

* * * * *